US009924048B2

(12) United States Patent
Zakharov

(10) Patent No.: US 9,924,048 B2
(45) Date of Patent: Mar. 20, 2018

(54) PRINTER STATUS REPORT WITH ENCODED IMAGE

(71) Applicant: KYOCERA Document Solutions Inc., Concord, CA (US)

(72) Inventor: Oleg Y. Zakharov, Concord, CA (US)

(73) Assignee: Kyocera Document Solutions, Inc., Osaka (JP)

( * ) Notice: Subject to any disclaimer, the term of this patent is extended or adjusted under 35 U.S.C. 154(b) by 0 days.

(21) Appl. No.: 15/199,621

(22) Filed: Jun. 30, 2016

(65) Prior Publication Data

US 2018/0007215 A1   Jan. 4, 2018

(51) Int. Cl.
    *H04N 1/00*    (2006.01)
    *G06F 3/12*    (2006.01)
    *G06K 15/02*   (2006.01)

(52) U.S. Cl.
    CPC ..... *H04N 1/00029* (2013.01); *H04N 1/00015* (2013.01); *H04N 1/00061* (2013.01); *H04N 1/00079* (2013.01); *H04N 1/00477* (2013.01); *H04N 2201/0094* (2013.01)

(58) Field of Classification Search
    None
    See application file for complete search history.

(56) References Cited

U.S. PATENT DOCUMENTS

| | | | | |
|---|---|---|---|---|
| 2007/0278303 A1* | 12/2007 | Cattrone | ........... | G06K 19/06009 235/462.1 |
| 2010/0225653 A1* | 9/2010 | Sao | ................ | H04L 51/38 345/520 |
| 2013/0069794 A1* | 3/2013 | Terwilliger | ............ | G06Q 10/08 340/815.45 |
| 2013/0114100 A1* | 5/2013 | Torii | ............... | G06F 11/0733 358/1.14 |
| 2013/0169996 A1* | 7/2013 | McLeod | ............. | G06K 7/1092 358/3.28 |
| 2013/0313313 A1* | 11/2013 | Boudville | ......... | G06F 17/30879 235/375 |
| 2014/0082430 A1* | 3/2014 | Bartlett | ............. | G06F 11/3055 714/47.3 |
| 2015/0035650 A1* | 2/2015 | Lind | ................ | H04B 5/0056 340/10.1 |
| 2016/0292629 A1* | 10/2016 | Matsuda | ............ | G06Q 10/087 358/1.15 |
| 2016/0344877 A1* | 11/2016 | Altamirano | ........ | H04N 1/00079 358/1.14 |
| 2016/0378584 A1* | 12/2016 | Oku | .................... | G06F 11/079 358/1.14 |

FOREIGN PATENT DOCUMENTS

JP    2005-064762    *    3/2005    ............... H04N 1/00

* cited by examiner

*Primary Examiner* — Beniyam Menberu
(74) *Attorney, Agent, or Firm* — West & Associates, A PC; Stuart J. West

(57) ABSTRACT

A method of diagnosing a printer's status using an encoded image printed and/or displayed by the printer. The printer can produce an encoded image, such as a barcode, that indicates status values in one or more categories. A client device with a camera, such as a smartphone, can take a picture of the encoded image and transmit it to a printer status server. The printer status server can analyze the status values encoded in the encoded image to diagnose problems with the printer, and can return applicable user instructions indicating how to fix and/or prevent the problems.

14 Claims, 6 Drawing Sheets

PRINTER STATUS REPORT WITH ENCODED IMAGE

BACKGROUND

Field of the Invention

The present disclosure relates to printers, particularly a system for submitting a status report from a printer to a printer status server when a direct or indirect network connection is unavailable between the printer and the printer status server.

Background

Printer status servers are often employed to track information about one or more printers over time. For example, printer status servers can receive data from individual printers to track counts of how many pages they have printed over time, their current toner levels, or any other information. Printer status servers can often diagnose current or future problems with the printers based on the data they receive, and can be used to retrieve maintenance instructions that can be followed to fix or prevent the detected problems.

However, most existing solutions require a direct or indirect data connection through which a printer can submit data about its condition to the printer status server, such as an internet connection or other network connection. These solutions can fail when the printer is not connected to the internet or a network connection is unavailable. For example, some printers are used in office intranets but are not connected to the internet, and as such cannot submit status data to a printer status server over a network. Even when printers are connected to the internet either directly or through an intermediate device, transmitting status data can fail when network problems are experienced. For example, when a firewall is misconfigured, a network cable goes bad, or an office's internet service provider has an outage, a printer can be prevented from submitting its data to the printer status server over the internet.

Some solutions have been developed for sending status data from a printer to a printer status server even when a direct or indirect network connection is unavailable between them. For example, printer status data can be copied from the printer onto removable media such as a memory card or USB stick. That data can again be copied from the removable media onto another device that has internet connectivity, such that the device can transmit it to the printer status server. However, this solution can be inconvenient due to the time involved in connecting removable media and transferring files physically, and can even be unworkable if removable media is unavailable.

What is needed is a system for submitting status data from a printer using an encoded image, such as a barcode, using the camera of a smartphone or other client device.

SUMMARY

The present disclosure provides a method of diagnosing a printer's status, comprising producing an encoded image with a printer, the encoded image having encoded status values in one or more status categories that describe the printer's current status. A digital picture of the encoded image can be received at a printer status server over a network connection. The printer status server can decode the encoded image and update a printer status database with the status values. The printer status server can analyze the status values and/or updated historical information in the printer status database to determine if a problem exists at the printer. If it does, the printer status server can retrieve a user instruction that describes corrective actions for fixing and/or preventing the problem, and electronically send the user instruction to a designated destination.

The present disclosure also provides a method of diagnosing a printer's status, comprising receiving a digital picture at a printer status server from a client device over a network connection, the digital picture being a picture of an encoded image that was produced by a printer and has encoded status values in one or more status categories that describe the printer's current status. The printer status server can decode the encoded image and update a printer status database with the status values. The printer status server can analyze the status values and/or updated historical information in the printer status database to determine if a problem exists at the printer. If it does, the printer status server can retrieve a user instruction that describes corrective actions for fixing and/or preventing the problem, and electronically send the user instruction to a designated destination.

The present disclosure also provides a method of diagnosing a printer's status, comprising generating a computer-readable status report with a printer that has status values in one or more status categories that describe the printer's current status. The computer-readable status report can be submitted from the printer to a printer status server when a data connection is available between the printer and the printer status server. When the data connection between the printer and the printer status server is unavailable, the printer can generate an encoded image that has encoded versions of the status values. The printer can produce the encoded image such that a digital picture of the encoded image can be taken with a digital camera at a client device and be transmitted to the printer status server. The printer status server can diagnose current and/or future problems with the printer based on the status values in the computer-readable status report and the encoded image, and retrieve one or more user instructions describing corrective actions for fixing and/or preventing the problems.

DETAILED DESCRIPTION

Figure 1A:
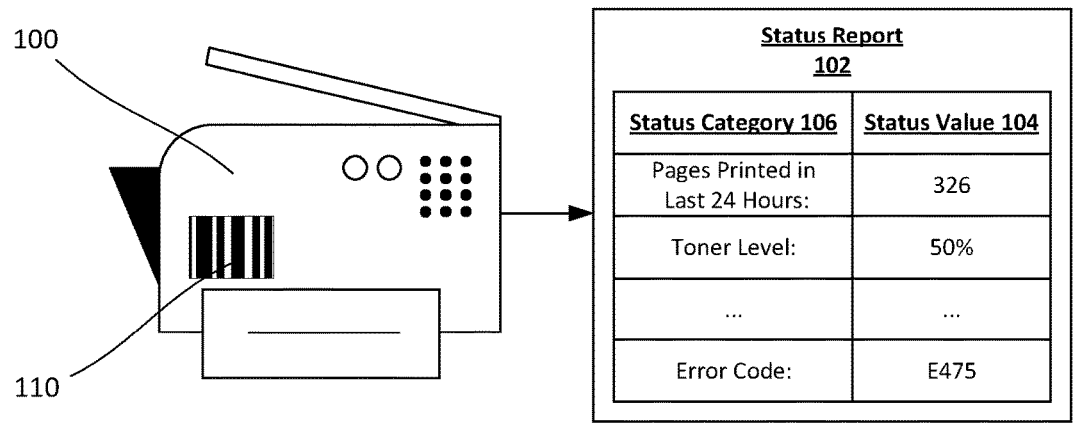
FIG. 1A depicts an embodiment of a printer producing a status report.
Figure 1B:
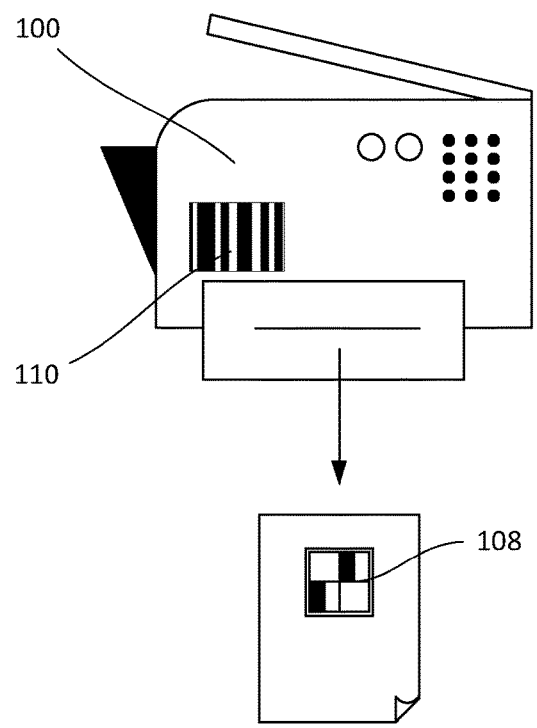
FIG. 1B depicts an embodiment of a printer producing a status report in an image-based format comprising an encoded image.

FIGS. 1A-1B depicts an embodiment of a printer 100 configured to generate a status report 102. A printer 100 can be a device configured to print text and/or images on paper or other substrates. In some embodiments, a printer 100 can be a standalone printer. In other embodiments, the printer 100 can be a multifunctional printer (MFP) that combines printing, scanning, copying, faxing, and/or other functions into a single device.

In some embodiments the printer 100 can be a laser printer that comprises laser diodes, lenses, mirrors, photoconductor drums, toner hoppers, charge rolls, fusers, and/or other components. In other embodiments the printer 100 can be an inkjet printer that comprises print heads, ink cartridges, and/or other components. In still other embodiments the printer 100 can be any other type of printer.

The printer 100 can be configured to generate a status report 102 that describes the printer's current status or condition. The printer 100 can be configured to generate a status report 102 at any time upon a request submitted by a user or a connected device, or automatically at regular or irregular intervals based on a preset schedule. By way of a non-limiting example, a printer 100 can generate a status report 102 upon request by a maintenance worker, such that the status report 102 can be analyzed to determine if any issues or problems exist at the printer 100 that the maintenance worker can fix with corrective actions.

A status report 102 can comprise one or more status values 104 indicating the printer's status in one or more status categories 106, as shown in FIG. 1A. By way of non-limiting examples, a status report 102 can indicate counts of pages printed over particular time windows, an average number of pages printed per print job, current and/or historical toner levels, error codes for current and/or past problems such as paper jams and uncompleted print jobs, and/or any other information in any status category.

In some embodiments or situations, the printer 100 can generate a status report 102 in a computer-readable data format that can be digitally transferred over a network using one or more network and/or file transfer protocols such as TCP/IP, HTTP, HTTPS, FTP, SFTP, or any other protocol. By way of non-limiting examples, the printer 100 can generate a status report 102 in an XML (Extensible Markup Language) format, a CSV (comma separated values) format, a JSON (JavaScript Object Notation) format, an encoded bitstream, or any other data format. In other embodiments or situations, the printer 100 can generate a status report 102 in a human-readable format, such as a plain text file that can be transferred digitally and/or printed by the printer 100.

As shown in FIG. 1B, the printer 100 can be configured to alternately generate a status report 102 in an image-based format wherein status values 104 in the status categories 106 are encoded into an encoded image 108. An encoded image 108 can be a one dimensional barcode, a two-dimensional matrix code such as a data matrix or QR (Quick Response) code, or any other type of encoded image. An encoded image 108 can comprise one or more data elements such as bars, cells, or boxes that can be colored and/or arranged to encode the status values 104.

In some embodiments, the data elements of an encoded image 108 can be grouped into subsets of varying sizes and/or shapes. Each predefined subset can be associated with a particular status category 106. The data elements within a subset associated with a particular status category 106 can be colored or arranged to encode the status value 104 for that status category 106. By way of a non-limiting example, a data matrix or QR code can have a predefined arrangement of subsets of cells, with each cell being colored black or white to represent an associated binary value. As such, the cells within a subset associated with a particular status category 106 can be colored to represent a binary encoding of a number, character, string, or other representation of a status value 104 for that status category 106.

In some embodiments, each subset of data elements within an encoded image 108 can contain at least the maximum number of data elements sufficient to encode all possible status values 104 for the associated status category 106. By way of a non-limiting example, when a status category 106 is an error code field intended to contain error codes expressed with at most two characters, the subset of data elements associated with that status category 106 can have at least a number of data elements sufficient to encode all possible two-character combinations. As such, an encoded image 108 can have a total number of data elements that is the sum of the maximum number of data elements sufficient to encode all possible status values 104 for all the status categories 106.

In some embodiments or situations, an image-based status report 102 can be printed onto a sheet of paper by the printer 100. The printer 100 can print out the encoded image 108 on the image-based status report 102 such that individual data elements within the encoded image 108 are large enough to be photographed and decoded. As will be discussed below, a digital camera 302 can be used to photograph the printed-out encoded image 108, such that the photographed version of the encoded image 108 can be decoded by a client device 300. While using a high resolution digital camera 302 in a well-lit environment may be preferable, the printer 100 can increase the likelihood of even a low-resolution digital camera 302 being able to capture the encoded image's information by using a pixels per inch setting and/or sizing the encoded image 108 on the page such that the dimensions of individual bars, cells, boxes, or other data elements are multiple printing pixels tall and/or wide.

In alternate embodiments or situations, the encoded image 108 of an image-based status report 102 can be displayed on a screen at the printer 100. In these embodiments, the screen can be large enough and/or high-resolution enough to display individual data elements of the encoded image 108 at a size large enough to be photographed and decoded even by low-resolution digital cameras 302. In some embodiments or situations in which the screen is relatively small and/or low-resolution, the screen can display a portion of an encoded image 108 or a modified encoded image 108 that includes an encoding of a subset of the status categories 106. By way of a non-limiting example, an encoded image representing just one piece of information, such as the printer's device ID, can be displayed on a small low-resolution screen.

In some embodiments or situations, the encoded image 108 of an image-based status report 102 can be produced in a size that is smaller than the size of a printed version of a status report 102 that was generated in a computer-readable or human-readable format. By way of a non-limiting example, in some situations a status report 102 produced in a computer-readable or human-readable format can be long enough such that it would be printed on multiple sheets of paper, while an encoded image 108 conveying the same information in an image-based status report 102 can be printed on a single sheet of paper. The length of computer-readable or human-readable formats can often be due to formatting and/or structural concerns, such as including section names or other descriptions that provide context to the information for a human reader or names of XML tags or other elements that can be included in computer-readable formats. In contrast, the encoded image 108 can be generated in a predefined format where specific status values 104 are encoded in predefined locations and/or formats within the encoded image 108, such that a decoding device can analyze the encoded image 108 to find the status values 104 in the expected locations and/or formats. As such, the encoded image 108 can save space relative to other formats by omitting redundant or contextual information such as section names, descriptive text, and element names, as well as whitespace or other formatting.

As will be described below with respect to FIG. 2, a status report 102 can be submitted to a printer status server 200 and/or printer status database 202 that can track and/or diagnose the printer's condition based on information contained in one or more status reports 102. In some embodiments, the printer 100 can have a marking 110 that indicates the identity of the printer status server 200 that has been assigned to track and/or diagnosed the printer's condition. By way of a non-limiting example, the marking 110 can be a sticker on the housing of the printer 100 that indicates information about the printer, such as the identity of the printer status server 200 and/or a URL or IP address associated with the printer status server 200 to which status reports 102 can be submitted. In some embodiments, the marking 110 can be an encoded image, such as a barcode or QR code, that is encoded with information about the printer status server 200.

Figure 2:
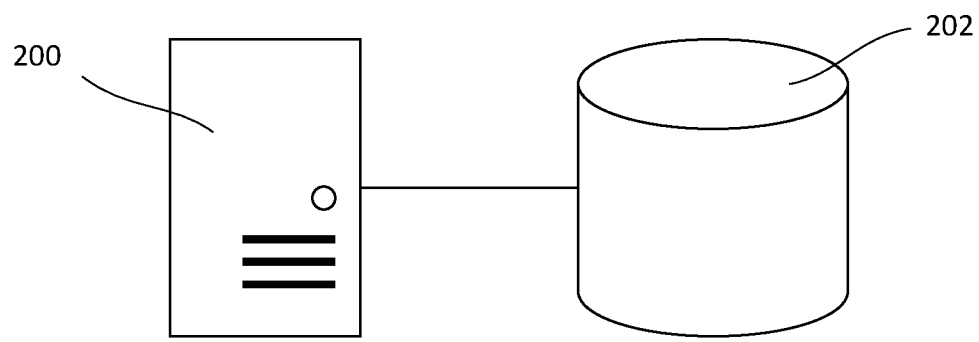
FIG. 2 depicts an embodiment of a printer status server and a printer status database.

FIG. 2 depicts an embodiment of a printer status server 200. A printer status server 200 can be a computing device, such as a computer or server, comprising processors, memory, circuits, a network communication interface, and/or other hardware and software elements. The printer status server's network communication interface can be a networking device configured to communicate with other devices over a wide area network (WAN) such as the internet, and/or over a local area network (LAN). By way of a non-limiting example, the printer status server 200 can be connected to the internet such that it can exchange data with other devices over the internet.

The printer status server 200 can store or be connected to a printer status database 202. The printer status database 202 can be a database that stores and updates historical information about the printer 100 over time, and/or stores a plurality of user instructions that are associated with status values 104 and/or historical information about the printer 100.

When a status report 102 is received at the printer status server 200, the printer status database 202 can be updated with new information from the status report 102. By way of a non-limiting example, in some embodiments the printer status database 202 can track and update information about the printer 100 over time, such as updating a historical count of how many pages the printer 100 has printed over its life as each new status report 102 is received.

If information in the status report 102, or updated historical information in the printer status database 202, meets one or more conditions that indicate that a problem exists at the printer 100 or that a problem will likely arise at the printer 100 within a set timeframe, the printer status server 200 can retrieve one or more user instructions associated with that problem from the printer status database 202. The user instructions can be followed by a user to correct or avoid the problem.

By way of a non-limiting example, if a status value 104 in the status report 102 is an error code indicating a paper jam at a particular location within the printer 100, the printer status server 200 can look up the error code in the printer status database 202 to find a user instruction that can be followed by a user to remove the paper jam.

By way of another non-limiting example, if the updated historical information about the printer 100 indicates that a toner cartridge is likely to run out of toner within a week based on a statistical analysis of how many pages are printed each day at the printer 100, the printer status database 202 can return a user instruction indicating that the toner cartridge should be replaced within a week.

By way of yet another non-limiting example, if the updated historical information about the printer 100 indicates that error codes related to a particular hardware component within the printer 100 have been received more frequently recently than in the past, the printer status server 200 can return a notification that the hardware component may be failing and should be replaced.

Figure 3:
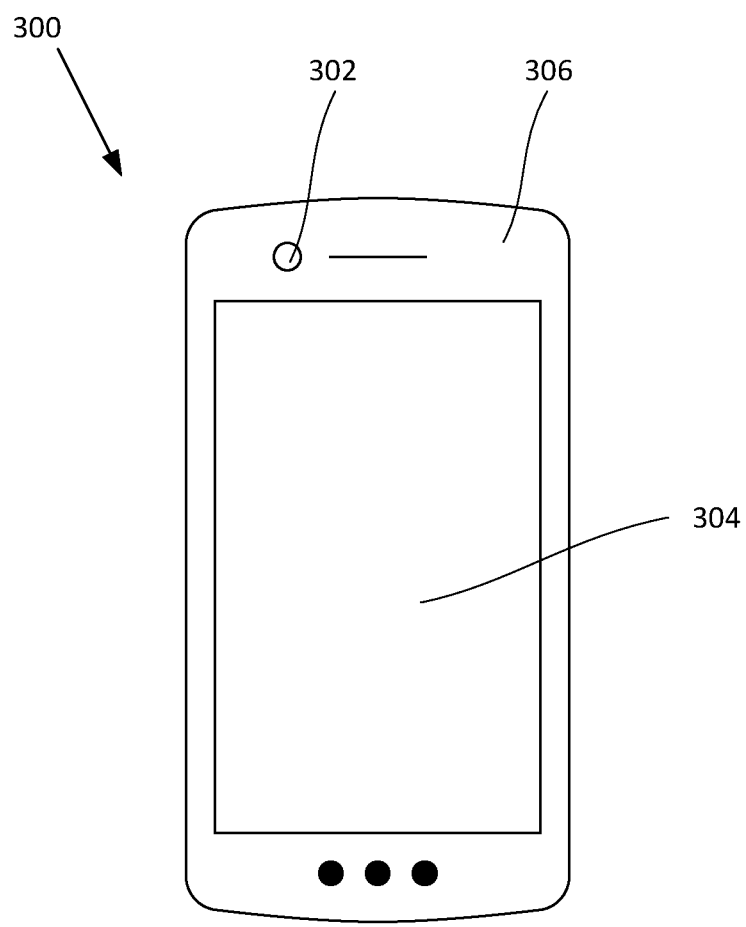
FIG. 3 depicts an embodiment of a client device.

FIG. 3 depicts an embodiment of a client device 300. In some embodiments, a client device 300 can be a computing device that comprises a digital camera 302 configured to take images and store them in memory at the client device 300. By way of a non-limiting example, a client device 300 can be a portable computing device that comprises a camera 302, such as a smartphone, tablet computer, laptop computer, or any other portable computing device comprising a camera 302. In alternate embodiments, a client device 300 can be a computing device that can receive and store in memory images taken by separate digital cameras 302. By way of a non-limiting example, a client device 300 can be a desktop computer that can receive and store digital images taken by separate cameras 302 through a memory card, a wireless connection, and/or a wireless connection.

A client device 300 can further comprise processors, memory, circuits, a user interface 304, a network communication interface 306, and/or other hardware and software elements. The client device 300 can run an application and/or operating system that is configured to communicate with the printer status server 200, as will be discussed further below.

The client device's user interface 304 can comprise hardware and/or software elements for receiving instructions from users and/or displaying information to users. By way of various non-limiting examples, the client device's user interface 304 can comprise a screen and/or input devices, such as liquid-crystal display (LCD) screens, other electronic screens, touchscreens, buttons, keyboards, switches, dials, indicator lights, speakers, graphical user interfaces, and/or any other input or output device.

The client device's network communication interfaces 306 can be networking devices configured to communicate with other devices, such as the printer status server 200, over the internet or other network connections. By way of a non-limiting example, the client device's network communication interface 306 can comprise a cellular data connection interface and/or a Wi-Fi connection interface, such that the client device can send and receive data over the internet wirelessly.

Figure 4:
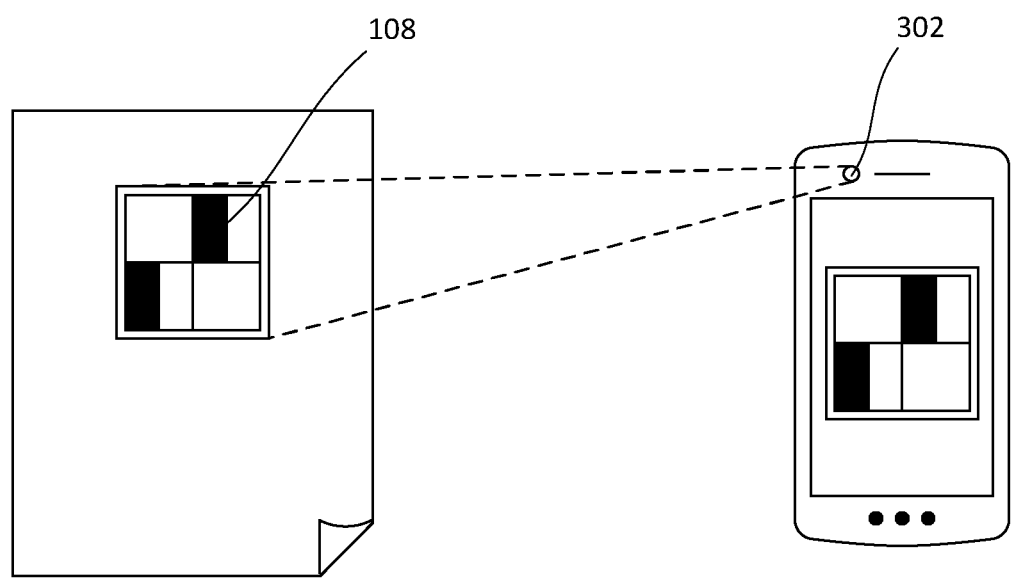
FIG. 4 depicts an embodiment of a client device taking a picture of an encoded image on an image-based status report.

As shown in FIG. 4, a client device's camera 302 can take a picture of an encoded image 108 on an image-based status report 102 produced by a printer 100, such as taking a picture of a printed version of the image-based status report 102 or taking a picture of an encoded image 108 displayed on a screen at the printer 100. In alternate embodiments, another camera 302 can take a picture of an encoded image 108 on an image-based status report 102, and the picture can be transferred to the client device's memory.

Figure 5A:
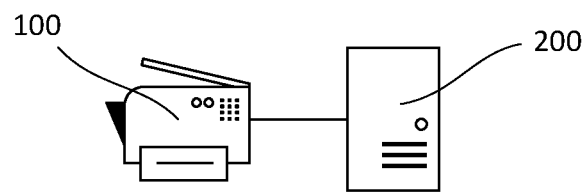
FIG. 5A depicts an exemplary operating environment in which a printer is in direct communication with a printer status server.
Figure 5B:
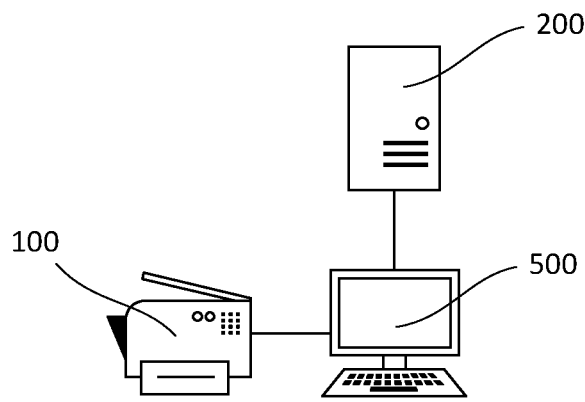
FIG. 5B depicts an exemplary operating environment in which a printer is in indirect communication with a printer status server via an intermediate terminal.
Figure 5C:
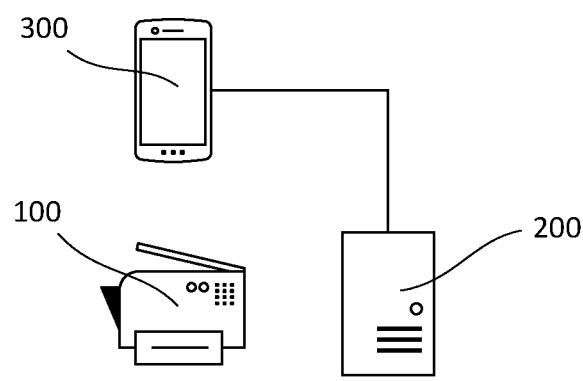
FIG. 5C depicts an exemplary operating environment in which a printer is in data isolation from a printer status server, while a client device is in communication with the printer status server.

FIGS. 5A-5C depict exemplary operating environments for communications between a printer 100, a printer status server 200, and/or a client device 300.

In the operating environment of FIG. 5A, the printer 100 can comprise network interface components such that it can establish a data connection with the printer status server 200 over a network using one or more network and/or file transfer protocols. By way of non-limiting examples, the printer 100 can comprise an Ethernet port and/or a Wi-Fi interface. In some embodiments, the printer 100 can communicate with the printer status server 200 through a wide area network, such as the internet. In other embodiments, the printer 100 can communicate with the printer status server 200 through a local area network, such as an office intranet.

In the operating environment of FIG. 5A, the printer 100 can generate status reports 102 periodically and/or on demand in a computer readable format, and submit the status reports 102 to the printer status server 200. In some embodiments, when the printer status server 200 analyses data in the status reports 102 and/or historical data about the printer 100 and finds one or more current or future problems, the printer status server 200 can return one or more user instructions associated with the problems to the printer 100 over the network connection to be displayed on a screen at the printer 100. In alternate embodiments, appropriate user instructions can be sent via email or any other electronic notification to a specified user and/or maintenance worker.

In the operating environment of FIG. 5B, the printer 100 can be in indirect data communication with the printer status server 200 via an intermediate terminal 500, such as a desktop computer or other computing device. The printer 100 can have a direct wired or wireless connection with the terminal 500. By way of a non-limiting example, the printer 100 can be linked with a terminal 500 with a USB cable. The terminal 500 can establish a data connection with the printer status server 200 over a network, such as a wide area network or local area network, such that the printer 100 can communicate with the printer status server 200 by passing data through the terminal 500. In this operating environment, the printer 100 can generate status reports 102 periodically and/or on demand in a computer readable format, and submit the status reports 102 to the printer status server 200 via the intermediate terminal. In some embodiments or situations, the printer 100 can push status reports 102 to the intermediate terminal 500 once they are generated on a schedule or on demand at the printer 100. In other embodiments or situations, software at the intermediate terminal 500 can request status reports 102 on a schedule or on demand, and the printer 100 can generate status reports when requested by the intermediate terminal 500.

In the operating environment of FIG. 5B, the intermediate terminal 500 can submit status reports 102 periodically and/or on demand to the printer status server 200. In some embodiments, when the printer status server 200 analyses data in the status reports 102 and/or historical data about the printer 100 and finds one or more current or future problems, the printer status server 200 can return one or more user instructions associated with the problems to the intermediate terminal 500 over the network connection. The returned user instructions can be displayed at the intermediate terminal and/or via a screen at the printer 100. In alternate embodiments, appropriate user instructions can be sent via email or any other electronic notification to a specified user and/or maintenance worker.

FIG. 5C depicts an operating environment in which the printer 100 is isolated from the printer status server 200, such that it is not in direct or indirect data communication with the printer status server 200. In some embodiment or situations, the operating environment of FIG. 5C can be the printer's intended configuration. By way of a non-limiting example, the printer 100 can be configured to print information from a computing device that is not connected to a network. In other embodiments or situations, the operating environment of FIG. 5C can arise from the environments of FIG. 5A or 5B when a direct or indirect connection cannot be established between the printer 100 and the printer status server 200. By way of a non-limiting example, if a network connection between the printer 100 and the printer status server 200 in the operating environment of FIG. 5A cannot be established due to an overloaded network, incorrect network configurations, firewall restrictions, disconnected cables, or damaged or malfunctioning network components at either the printer 100 or printer status server 200, the environment of FIG. 5A can become the environment of FIG. 5C.

In the operating environment of FIG. 5C, a client device 300 can be in data communication with the printer status server 200 using one or more network protocols, such as over the internet or another wide area network. By way of a non-limiting example, the client device 300 can be connected to the internet via a Wi-Fi connection or over a cellular data connection, and can exchange data with the printer status server 200 through that internet connection.

In embodiments and/or situations such as the operating environment of FIG. 5C, in which a communications link between the printer 100 and the printer status server 200 does not exist or cannot be established, the printer 100 can be prevented from sending computer-readable status reports 102 to the printer status server 200. In these embodiments and/or situations, the printer 100 can generate an image-based status report 102 as shown in FIG. 1B. The client device 300 can take a picture of the status report's encoded image 108 with its camera 302, or receive a picture of the encoded image 108 that was taken by a separate camera 302. By way of non-limiting examples, the printer 100 can print out a copy of an image-based status report 102 comprising an encoded image 108 as shown in FIG. 1B, and the client device 300 can take a picture of the encoded image 108 with its camera 302 as shown in FIG. 4.

When the client device 102 has a picture of the encoded image 108, it can send the picture of the encoded image 108 to the printer status server 200. The printer status server 200 can decode the encoded image 108 to determine the status values 104 in the status categories 106. By way of a non-limiting example, the printer status server 200 can use image recognition processing to locate a subset of data elements for each status category 106 in the encoded image 108 based on a predefined arrangement of subsets, and review the data elements within each subset to decode a status value 104 for the associated status category 106.

The printer status server 200 can decode status values 104 and/or use them to update historical data about the printer 100. If the printer status server 200 diagnoses one or more current or future problems with the printer 100 based on the decoded status values 104 and/or updated historical data, the printer status server 200 can return one or more user instructions associated with the problems to the client device 300 over the network connection. The returned user instructions can be displayed via the client device's user interface 304. In alternate embodiments, appropriate user instructions can be sent via email or any other electronic notification to a specified user and/or maintenance worker.

Figure 6:
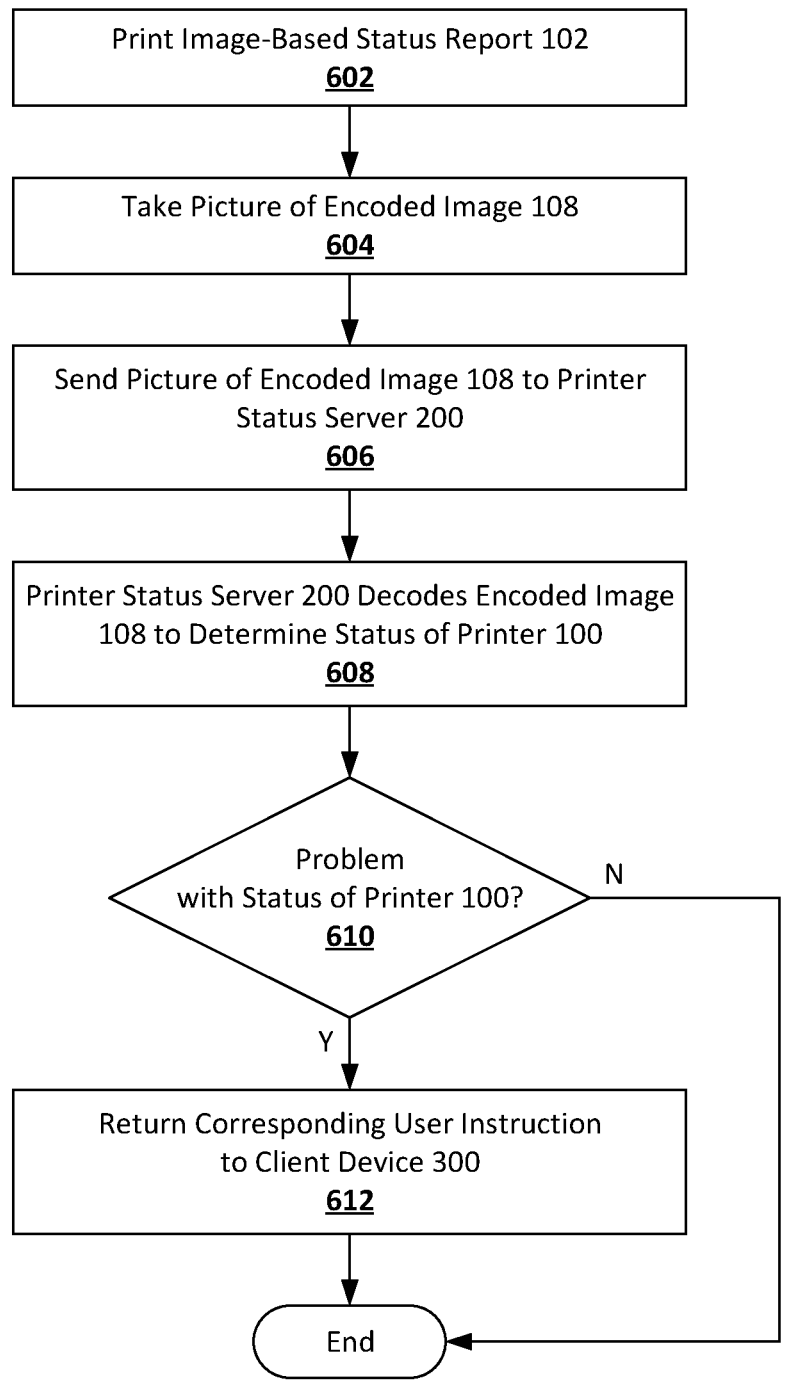
FIG. 6 depicts a flowchart of a process for diagnosing a printer using an image-based status report with a client device and a printer status server.

FIG. 6 depicts a flowchart of a process for diagnosing a printer 100 using an image-based status report 102 with a client device 300 and a printer status server 200.

At step 602, the printer 100 can print out an image-based status report 102 comprising an encoded image 108 that is encoded with information about the printer's current status, such as status values 104 in one or more status categories 106. In some embodiments or situations, the printer 100 can print out the image-based status report 102 in response to a user instruction. By way of a non-limiting example, a maintenance worker can use the printer's user interface to request that the printer 100 print out an image-based status report 102. In alternate embodiments, the printer 100 can display an image-based status report 102 on its screen.

At step 604, a client device 300 can take a digital picture of the image-based status report's encoded image 108 with its camera 302. In alternate embodiments, a separate camera 302 can take a digital picture of the encoded image 108, and that digital picture can be uploaded or transferred to the client device 300.

At step 606, the client device 300 can transmit the digital picture of the encoded image 108 to the printer status server 200, through one or more network and/or file transfer protocols. In some embodiments, the client device 300 can take a picture of a marking 110 on the printer 100 to determine information about the printer status server 200, including how to transmit the picture to the printer status server 200. By way of a non-limiting example, the marking 110 can be a barcode that indicates a submission URL through which pictures can be transmitted to the printer status server 200. In other embodiments, a user can manually enter information into the client device 300 about the printer status server 200, such a submission URL associated with the printer status server 200.

At step 608, the printer status server 200 can receive the digital picture of the encoded image 108 and can decode the encoded image 108 to find the status report's status values 104. In some embodiments, the printer status server 200 can use image recognition processing to locate a subset of data elements for each expected status category 106 in the encoded image 108 based on a predefined arrangement of subsets. The printer status server 200 can review the data elements within each subset to decode a status value 104 for the associated status category 106. By way of a non-limiting example, the printer status server 200 can review a subset of black or white cells in a data matrix, interpret the color of those cells as binary values, and decode the binary values as a number, character, string, or other representation of data. The printer status server 200 can use the decoded status values 104 to update historical information about the printer 100 in its printer status database 202.

At step 610, the printer status server 200 can determine whether any of the status values 104 decoded from the received digital picture, or any of the updated pieces of historical information about the printer 100 in the printer status database 202, indicate that the printer 100 is experiencing a problem or is likely to experience a problem within a set timeframe. If no current or future problems are found, the process can end or the printer status server 200 can return a confirmation message to the client device 300 that indicates that no problems were found in response to the status report 102.

However, if at step 612 the printer status server 200 finds one or more current or upcoming problems based on the status report 102 and/or historical information about the printer 100, the printer status server 200 can retrieve one or more user instructions from the printer status database 202 that correspond with those problems. The printer status server 200 can return those user instructions to the client device 300 at step 614, such that the user operating the client device 300 can perform the operations at the printer 100 to fix or avoid the detected problems. Alternately, the printer status server 200 can electronically send the user instructions to a predetermined email address or other electronic destination.

Figure 7:
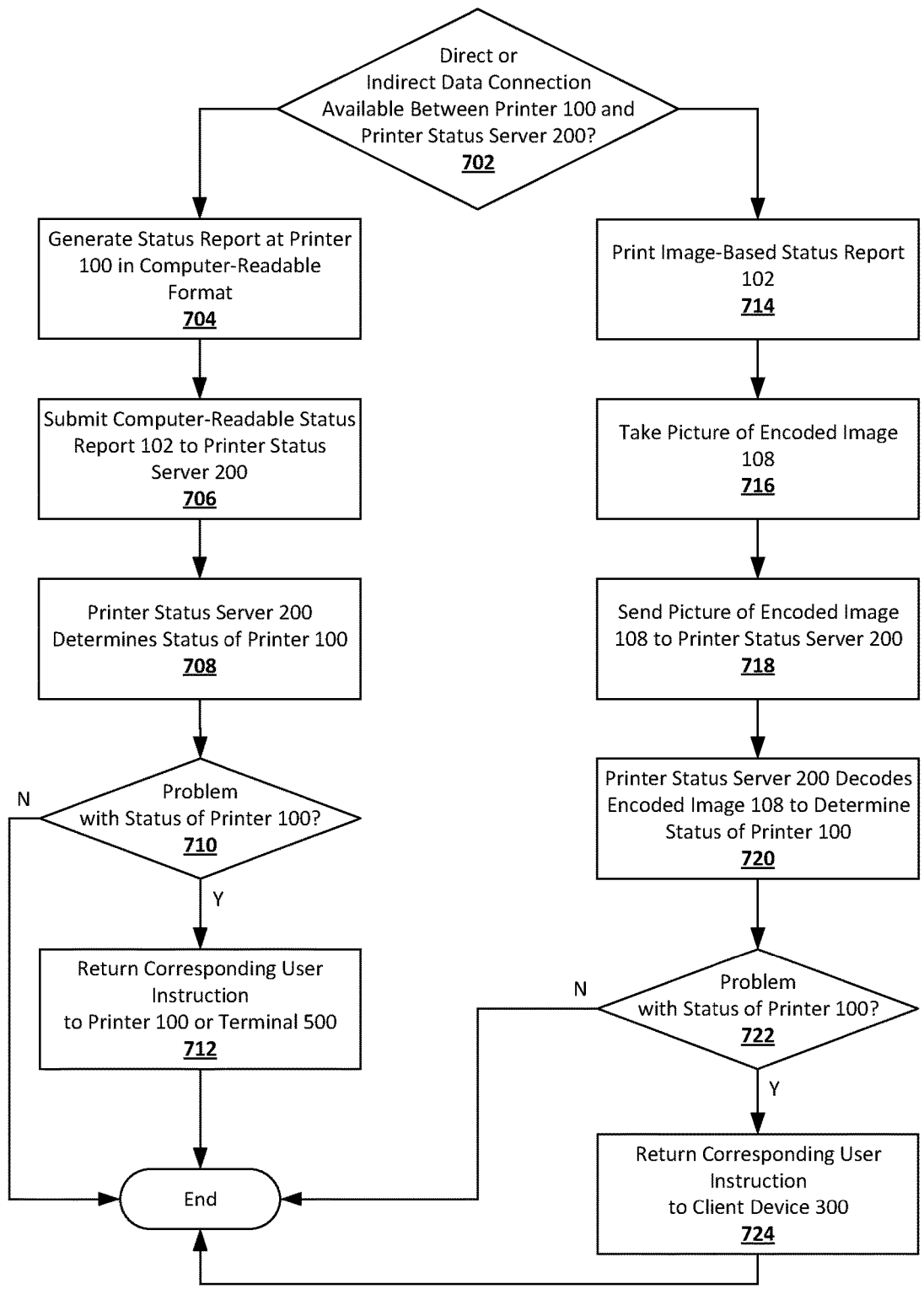
FIG. 7 depicts a flowchart of a process for diagnosing a printer using either a computer-readable status report with a printer status server, or an image-based status report with a client device and a printer status server.

FIG. 7 depicts a flowchart of a process for diagnosing a printer 100 using either a computer-readable status report 102 with a printer status server 200, or an image-based status report 102 with a client device 300 and a printer status server 200.

At step 702, the printer 100 or a terminal 500 connected to the printer 100 can determine if a direct or indirect data connection can be established between the printer 100 and the printer status server 200. If it can, such as if the printer 100 is in an operating environment such as those shown in FIG. 5A or 5B, the printer 100 can move to step 704. However, if no direct or indirect data connection can be established between the printer 100 and the printer status server 200, such as if the printer 100 is in the operating environment shown in FIG. 5C, the printer 100 can move to step 714.

In some embodiments or situations, step 702 can be performed upon request by a user. By way of a non-limiting example, a maintenance worker can input a command at the printer 100 or a connected terminal 500 to attempt to connect the printer 100 to the printer status server 200 so that it can send a computer-readable status report 102 to the printer status server 200. In other embodiments or situations, step 702 can be performed on a regular or irregular automatic schedule through applications or operating systems running at the printer 100 and/or terminal 500. In some embodiments or situations where step 702 is performed on an automated schedule but no direct or indirect connection is found to be available between the printer 100 and the printer status server 200, the printer 100 can display an error message through its user interface and/or display or print out an image-based status report 102, thereby indicating to a user that steps 714-724 should be followed to submit the image-based status report 102 to the printer status server 200 and retrieve any applicable user instructions.

If at step 702 a direct or indirect data connection is found to be available between the printer 100 and the printer status server 200, the printer 100 can generate a status report 102 in a computer readable format at step 704.

At step 706, the printer 100 can submit the computer-readable status report 102 to the printer status server 200 through one or more network and/or file transfer protocols. If the direct or indirect connection has not yet been established between the printer 100 and the printer status server 200, it can be established before the status report 102 is submitted to the printer status server 200.

At step 708, the printer status server 200 can receive the computer-readable status report 102 and parse it to find the status report's status values 104. The printer status server 200 can use the parsed status values 104 to update historical information about the printer 100 in its printer status database 202.

At step 710, the printer status server 200 can determine whether any of the status values 104 in the received computer-readable status report 102, or any of the updated pieces of historical information about the printer 100 in the printer status database 202, indicate that the printer 100 is experiencing a problem or is likely to experience a problem within a set timeframe. If no current or future problems are found, the process can end or the printer status server 200 can return a confirmation message to the printer 100 and/or terminal 500 that indicates that no problems were found in response to the status report 102.

However, if at step 712 the printer status server 200 finds one or more current or upcoming problems based on the status report 102 and/or historical information about the printer 100, the printer status server 200 can retrieve one or more user instructions from the printer status database 202 that correspond with those problems. The printer status server 200 can return those user instructions to the printer 100 and/or terminal 500, such that a user operating the printer 100 and/or terminal 500 can perform the operations at the printer 100 to fix or avoid the detected problems. Alternately, the printer status server 200 can electronically send the user instructions to a predetermined email address or other electronic destination. By way of a non-limiting example, when the status reports 102 are generated and submitted on an automated schedule, any returned user instructions can be transmitted to a maintenance department's email address, such that a maintenance worker can be dispatched to the printer 100 to perform the user instructions.

Returning to step 702, if a direct or indirect data connection is not found to be available between the printer 100 and the printer status server 200, printer 100 can print out an image-based status report 102 comprising an encoded image 108 at step 714. In alternate embodiments, the printer 100 can display an image-based status report 102 on its screen.

At step 716, a client device 300 can take a digital picture of the image-based status report's encoded image 108 with its camera 302. In alternate embodiments, a separate camera 302 can take a digital picture of the encoded image 108, and that digital picture can be uploaded or transferred to the client device 300.

At step 718, the client device 300 can transmit the digital picture of the encoded image 108 to the printer status server 200, through one or more network and/or file transfer protocols. In some embodiments, the client device 300 can take a picture of a marking 110 on the printer 100 to determine information about the printer status server 200, including how to transmit the picture to the printer status server 200. In other embodiments, a user can manually enter information into the client device 300 about the printer status server 200, such a submission URL associated with the printer status server 200.

At step 720, the printer status server 200 can receive the digital picture of the encoded image 108 and can decode the encoded image 108 to find the status report's status values 104. The printer status server 200 can use the decoded status values 104 to update historical information about the printer 100 in its printer status database 202.

At step 722, the printer status server 200 can determine whether any of the status values 104 decoded from the received digital picture, or any of the updated pieces of historical information about the printer 100 in the printer status database 202, indicate that the printer 100 is experiencing a problem or is likely to experience a problem within a set timeframe. If no current or future problems are found, the process can end or the printer status server 200 can return a confirmation message to the client device 300 that indicates that no problems were found in response to the status report 102.

However, if at step 722 the printer status server 200 finds one or more current or upcoming problems based on the status report 102 and/or historical information about the printer 100, the printer status server 200 can retrieve one or more user instructions from the printer status database 202 that correspond with those problems. The printer status server 200 can return those user instructions to the client device 300 at step 724, such that the user operating the client device 300 can perform the operations at the printer 100 to fix or avoid the detected problems. Alternately, the printer status server 200 can electronically send the user instructions to a predetermined email address or other electronic destination.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A method of diagnosing a printer's status, comprising:
periodically producing encoded images at a printer based on an automated schedule, each encoded image comprising encoded representations of status values in one or more status categories that describe the printer's current status;
receiving a digital picture comprising one of the encoded images at a printer status server from a client device over a network connection, thereby providing a received encoded image, wherein a network address of the printer status server is indicated on indicia attached to the printer and the client device obtains the network address for the printer status server responsive to an image of the indicia;
decoding the received encoded image at the printer status server to obtain current status values;
updating a printer status database configured to track historical data about the printer with the current status values from the received encoded image;
analyzing the current status values and comparing the current status values to historical data, thereby determining whether a problem exists at the printer;
retrieving, upon determining that the problem exists, a user instruction from the printer status database that describes corrective actions that can be taken to fix and/or prevent the problem; and,
electronically sending the user instructions from the printer status server to a designated destination, wherein the network address of the designated destination is associated with the network address of the printer status server.

2. The method of claim 1, wherein producing one of the encoded images comprises printing said encoded image onto paper with said printer.

3. The method of claim 1, wherein producing one of the encoded images comprises displaying said encoded image on a screen at said printer.

4. The method of claim 1, wherein one of the encoded images is a barcode and/or QR code.

5. The method of claim 1, wherein the designated destination is the client device that submitted the digital picture.

6. The method of claim 1, wherein the designated destination is an email address.

7. The method of claim 1, wherein the user instruction is based on an error code received as one of the current status values.

8. The method of claim 1, wherein the user instruction is based on historical information updated with the current status values that meets a problem condition.

9. The method of claim 1, wherein said printer status server performs image recognition processing on said received encoded image to locate subsets of data elements at predefined locations within said encoded image, each of said subsets being one of said encoded representations of status values.

10. A method of diagnosing a printer's status, comprising:
generating a computer-readable status report, periodically according to an automated schedule, with a printer that comprises status values in one or more status categories that describe the printer's current status, and submitting the computer-readable status report from the printer to a printer status server when a data connection is available between the printer and the printer status server; and,
generating an encoded image at the printer when the data connection between the printer and the printer status server is unavailable, the encoded image comprising encoded representations of the status values, and producing the encoded image with the printer such that a digital picture of the encoded image can be taken with a digital camera at a client device and the client device can transmit the digital picture to the printer status server;
wherein the printer status server is configured to diagnose current and/or future problems with the printer based on the status values in the computer-readable status report and the encoded image, and to retrieve one or more user instructions describing corrective actions for fixing and/or preventing the problems; and,
wherein a network address of the printer status server is indicated on indicia attached to the printer and the client device obtains the network address for the printer status server responsive to an image of the indicia.

11. The method of claim 10, wherein producing said encoded image comprises printing said encoded image onto paper with said printer.

12. The method of claim 10, wherein producing said encoded image comprises displaying said encoded image on a screen at said printer.

13. The method of claim 10, wherein the printer status server is further configured to transmit the user instructions to the client device that submitted the digital picture.

14. The method of claim 10, wherein said printer submits a computer-readable status report to said printer status server on said automated schedule when said data connection is available, and produces an encoded image on said automated schedule when said data connection is unavailable.

* * * * *